Aug. 26, 1958     A. R. MacPHERSON     2,849,189
MATERIAL REDUCTION MILL
Filed April 7, 1955     2 Sheets-Sheet 1
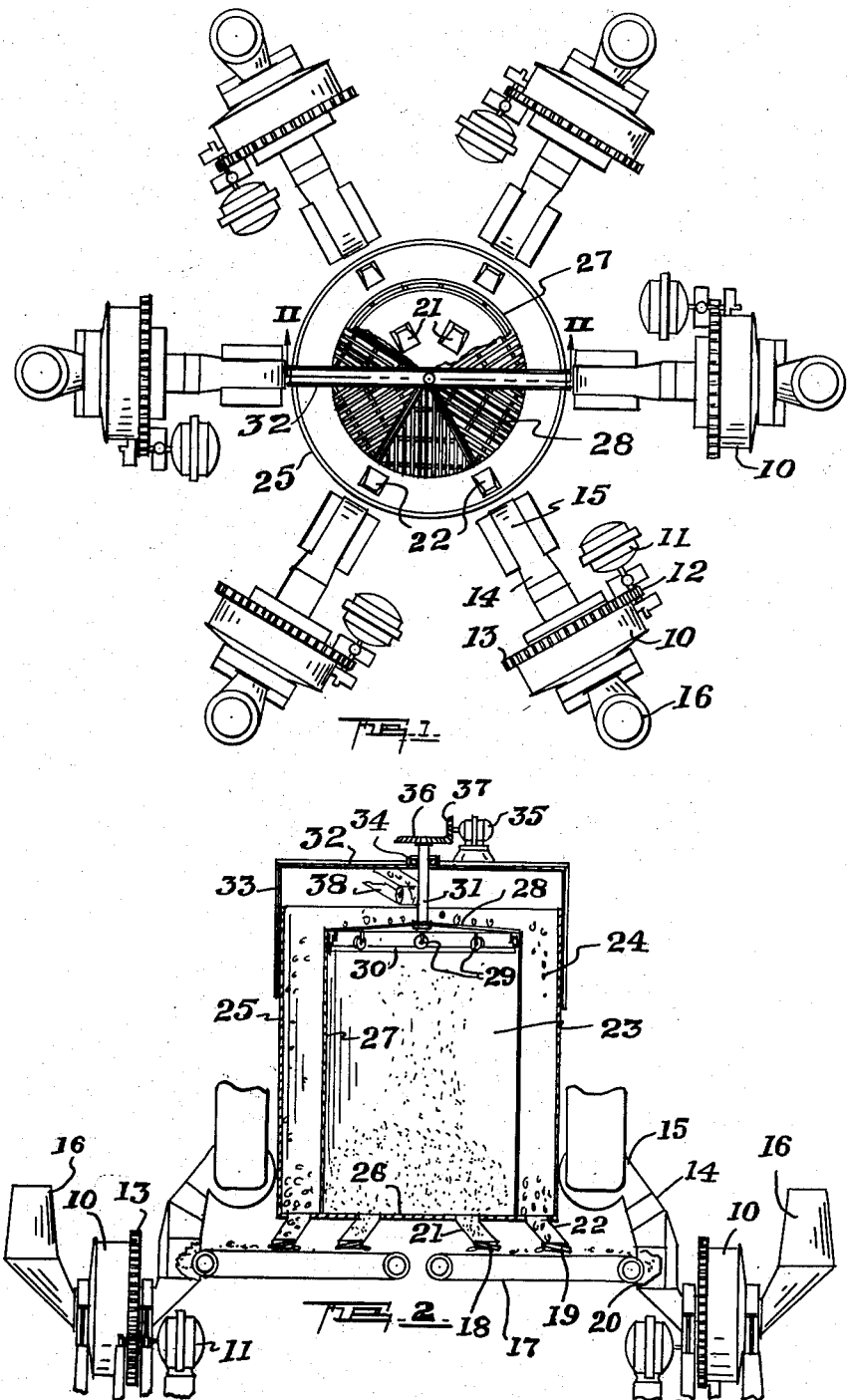
INVENTOR
ARTHUR R. MACPHERSON
BY
ATTORNEYS

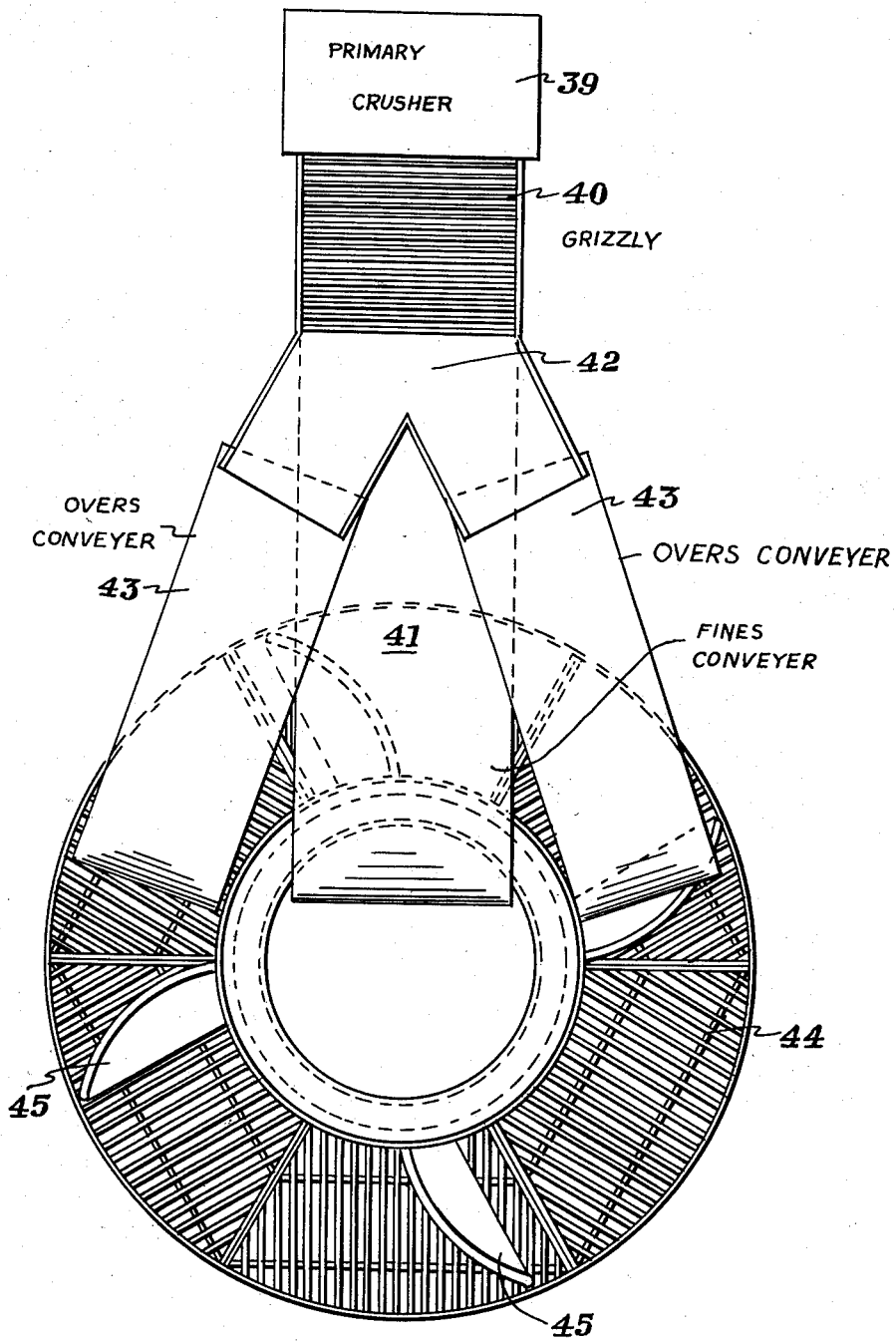

United States Patent Office 2,849,189
Patented Aug. 26, 1958

2,849,189

MATERIAL REDUCTION MILL

Arthur R. MacPherson, Toronto, Ontario, Canada, assignor to Aerofall Mills Incorporated, Columbus, Ohio, a corporation Application April 7, 1955, Serial No. 499,916

2 Claims. (Cl. 241—81)

This invention relates to a plant for comminution of minerals such as ore, rock and the like and relates more particularly to large scale plants comprising a plurality of milling units of the rotating drum type.

In material reduction mills of the rotating drum type, it is desirable that adequate ready storage means be readily at hand in close proximity to the mill and that such storage means have an adequate capacity to supply the demands of the mill at a rate consistent with optimum conditions of reduction efficiency of the mill. The provision of such storage facilities is a relatively simple matter in the case where the plant consists of only one or two milling units, but in large scale plants which may include several times that number of milling units a considerable problem arises in connection with the handling of the large quantities of feed material required and the equitable distribution of the same to the individual milling units. The tonnages involved may be appreciated from the fact that a single rotating drum type mill as defined in prior Patent 2,555,171 to David Weston, issued May 29, 1951, may have a capacity of up to 2,000 tons per day, depending upon the type of material which is being treated and the size range to which the material is being reduced. Six of such units, therefore, may require facilities capable of handling up to 12,000 tons of feed per day. The raw feed for such mills is normally run of mine or run of quarry material having a maximum particle size of about 18" in the largest dimension, or alternatively, will be run of mine or run of quarry which has been subjected to a primary crushing stage to produce a conditioned feed. With large milling units, it has been found necessary according to prior practices to have separate storage means either for each milling unit independently, or at least for every pair of milling units. It will be appreciated that in a plant containing a relatively large number of milling units such an arrangement leads to a very complicated system of conveyors which require constant attention and which require a building which is proportionately as large relative to the total tonnage treated as a building arranged to accommodate only one such milling unit. Similarly, the capital cost of the storage means is almost as great per mill as in the case of smaller plants containing only one milling unit.

The principal object of the present invention is to provide a novel plant layout for large-scale milling plants embodying several milling units which enables the use of a novel storage and feeding arrangement whereby the capital cost for feed handling and storage at the site of the milling units is considerably less per unit than previously proposed arrangements and whereby the total building volume per ton of mill capacity is also correspondingly reduced in comparison to prior practices.

According to my invention, I provide, in a plant for the comminution of minerals, the combination of elements comprising a plurality of milling units arranged in substantially symmetrical formation about some central point. A vertical storage bin is disposed substantially over said central point and I provide means for loading the material to be stored into the top of said bin, said means being arranged so that the material is segregated more or less completely into coarse and fine fractions. In the bottom of the storage bin a plurality of outlets are provided, each said outlet having controllable feeder means to regulate the feeding of material therethrough and the outlets are arranged so that controlled portions of both coarse and fine material may be supplied to each said milling unit.

In one preferred form of this invention, the milling units are arranged in a circular formation with their axes of rotation converging to a central point.

The bin itself in the simplest embodiment of this invention may be a cylindrical structure which is open at the top. With such a storage bin I contemplate that the loading means would comprises a substantially conventional conveyor system which would carry mixed run-of-mine or run-of-quarry material to a point substantially over the central axis of the bin. The mixed material loaded in this way tends to segregate naturally into fine and coarse fractions, with the fine material remaining substantially in the central part of the bin and the coarse material collecting around the periphery.

In another embodiment of my invention I divide the storage bin into substantially separate compartments. In the case of a cylindrical bin an inner wall is disposed coaxially to the outer wall thus dividing the bin into an inner cylindrical compartment and an outer annular compartment.

In any case, when separate compartments are provided for fine and coarse material, separate loading means for the coarse and fine material may be arranged at the top of the bin. Alternatively a grizzly can be positioned over one of the compartments and the mixed run-of-quarry or run-of-mine material is fed thereon. The "through" or fine material is deposited in at least one compartment and the "overs" or coarse material is deposited in the other compartment or compartments. Clearly it is also possible to separate the mixed material into coarse and fine fractions and subsequently transport the fractions on separate conveyors to the separate compartments. It is obviously a matter of choice whether the fine and coarse material are stored in the inner and outer compartments respectively or vice versa.

In any case, separate outlets are arranged in the bottom of the storage bin for the fine and coarse material. In the preferred forms of my invention, outlets for fine and coarse material are provided for each milling unit and each outlet is provided with a controllable feeder means so that any desired proportion of fine and coarse material can be fed to each separate unit. Conveyor means are provided to deliver the material from the outlets to the inlet port of each mill.

Preferred embodiments of the invention are illustrated in the accompanying drawings, and the invention will be described in more detail with reference to said drawings wherein:

Figure 1 is a top plan view of a plant layout according to the invention embodying six milling units, Figure 2 is a side elevation of the plant illustrated in Figure 1 with the feed bin shown in section along the plane II—II of Figure 2, and Figure 3 is a top plan view of an alternative embodiment comprising a plant having a primary crusher and grizzly with a conveyor system for loading the storage bin.

With particular reference to the drawings, a preferred form of the invention is illustrated by the plan view of Figure 1 in which six milling units 10 are arranged in circular formation. The milling units 10 are generally of the type described in prior Patent 2,555,171 issued May 29, 1951, to David Weston, and are each driven by a motor 11 through a drive pinion 12 and girth gear 13. An airstream is passed into the mills 10 through the duct 14 under the influence of the impellers 15. The airstream and entrained mill product pass off through the ducts 16 on the opposite side of the mill. Each mill is provided with a conveyor 17 which receives coarse and fine feed materials from the fine and coarse feeders 18 and 19 disposed immediately above their associated conveyor 17, the feed material being discharged into the mills 10 through the feed ports 20. The feeders 18 and 19 are disposed respectively at the bottom of the outlets 21 and 22 which are at the bottom of the storage bin. In the particular form shown in Figure 1, the inner cylindrical compartment 23 and the outer annular compartment 24 provide separate storage means for the fine and coarse fractions of the feed.

The centrally disposed vertical storage bin shown in Figure 1 comprises a cylindrical outer wall 25 and an essentially circular floor 26. An inner cylindrical wall 27 is disposed co-axially to said outer wall 25, thus dividing the said bin into the inner cylindrical compartment 23 and the outer annular compartment 24. By arranging the compartments in this way, the inner wall 27 may, in certain cases, be constructed from lighter gauge material than is used for the outer wall 25. If the inner and outer compartments 23 and 24 are loaded evenly and the operation of the mills is arranged in such a manner that the levels of the material in the compartments is kept substantially the same, then there will be no transverse load across the wall 27. However, it will be realized that in actual construction, the inner wall 27 has to be strong enough to take care of different levels in the compartments due to uneven loading or differing rates of feeding. In certain cases the material to be loaded may be substantially uniform in size so that only one of the compartments will be loaded. It will be apparent that in a plant where the operations of loading and feeding to the milling units are maintained at a substantially uniform rate, the storage bin could very well be of the simple unitary type mentioned hereinabove.

In a plant which makes use of the unitary type bin, the means for loading the material will comprise a substantially conventional conveyor which drops the material at the center of the bin. As pointed out before, the material will tend to segregate naturally, with the finer material remaining near the center and the coarser material rolling outwardly. Clearly the separation will not be as complete with this method as with screenings but the simplest method is nevertheless useful in many circumstances. Alternatively, I may use means for separating the material to be loaded into coarse and fine fractions and load the different fraction into different parts of the storage bin. It will be obvious to a skilled engineer that various means for separating the run-of-mine or run-of-quarry material can be used depending on the particular form of storage bin which it is desired to use and on other circumstances peculiar to the particular plant, such as the relative positions of the storage bin and the point of delivery of the material from mine or quarry. As one preferred form of the means for feeding the segregated material, I provide a rotary circular grizzly 28 which is positioned over the inner compartment 23 as shown in Figure 2. The grizzly 28 may be provided with a series of flanged wheels 29 symmetrically arranged about the periphery of the grizzly 28 and depending therefrom. The wheels 29 are adapted to engage a circular rail 30 attached to the outer wall 27. In this way, the grizzly 28 may be rotated with a minimum of friction and maintained in proper position even when under heavy load. The grizzly 28 is powered by suitable means, preferably through a centrally disposed shaft 31. I prefer to provide an overhead beam 32 diametrically disposed relative to the bin and mounted on shoulders 33 which are attached to or made integral with the outer wall 25. A suitable bearing 34 is provided at the middle of the beam 32 to accommodate the shaft 31, and the power means, for example an electric motor 35, may be mounted on the said beam. The power from said motor 35 may be transmitted by a set of gears, such as the bevel gears 36 and 37, and any desired speed reduction can easily be achieved.

Alternatively, the grizzly 28 could be rotatably supported by the outer wall 25 and slope inwardly to the inner wall 27, in which case the drive means may be positioned near the upper edge of the wall 25 and engage the outer run of the grizzly 28, through gearing or the like.

The run-of-quarry or run-of-material, which may be conditioned in a primary crusher, is transported on a conveying system 38 and discharged therefrom on to the rotating grizzly 28. In the embodiment illustrated in Figure 2, the "through" material drops directly into the inner compartment 23 and the "overs" material is rolled over the edge of the grizzly 28 into the outer compartment 24. In the alternative embodiment the "through" material is collected in the outer compartment 24 and the "overs" is deposited in the inner compartment 23.

As another embodiment of the invention the means for segregating and feeding the segregated material into the storage bin may be constructed as shown in Figure 3. In this embodiment, the run-of-mine or run-of-quarry material may be conditioned in a primary crusher 39 and grizzled on a first grizzly 40. Clearly the primary crusher 39 may not be required for some materials and is an optional part of the system. The "through" material from the grizzly 40 is deposited on a conveyor 41 which may conveniently be referred to as the "fines" conveyor. The "fines" conveyor 41 transports the through material directly into the cylindrical inner compartment 23 of the storage bin. The "overs" from the grizzly 40 are directed by a chute 42, which is preferably bifurcated as shown in Figure 3, onto the "overs" conveyors 43. The "overs" conveyors 43 transport the coarse material onto an annular grizzly 44. A plurality of sweeps 45 are provided to distribute the material from the conveyors over the grizzly 44. In this embodiment of the invention it is preferred, as indicated, to arrange the "overs" conveyors 43 so that the coarse material is distributed equally at opposite sides of the storage bin, and the sweeps 45 are adapted to spread the coarse material over the entire surface of the grizzly 44. In this way there is obtained an even distribution of the coarse material around substantially the entire cross-sectional area of the annular outer compartment 24. It will be realized that the function of the grizzly 44 is to assist in such distribution, and there are accordingly no strict requirements for the configuration thereof. Obviously, the bars of the grizzly 44 should be spaced sufficiently to allow all the coarse material to pass through.

What I claim as my invention is:

1. In a plant for the comminution of minerals comprising a plurality of milling units of the rotating drum type arranged in substantially circular formation with their axes of rotation converging to a central point; a vertical cylindrical storage bin arranged with its central axis substantially over said central point, said storage bin comprising an outer cylindrical wall, and an inner cylindrical wall co-axial with said outer wall and dividing said storage bin into an inner cylindrical compartment and an outer annular compartment; a rotary grizzly disposed at the upper end of said inner compartment and arranged to deliver fine material to said inner compartment and coarse material uniformly around said outer compartment; means for feeding unsegregated material onto said grizzly; a plurality of outlet ports in the bottom of said inner and outer compartments, one of said outlet ports in each said compartment being connected by conveyor means with an associated milling unit; feeders in each said outlet port for controllably feeding material for passage into said associated milling unit.

2. In a plant for the comminution of minerals comprising a plurality of milling units of the rotating drum type arranged in substantially circular formation with their axes of rotation converging to a central point; a vertical cylindrical storage bin arranged with its central axis substantially over said central point, said storage bin comprising an outer cylindrical wall, and an inner cylindrical wall co-axial with said outer wall and dividing said storage bin into an inner cylindrical compartment and an outer annular compartment; feed distributing means disposed at the upper end of said inner compartment and arranged to deliver fine material to said inner compartment and coarse material uniformly around said outer compartment; means for feeding unsegregated material to said feed distributing means; a plurality of outlet ports in the bottom of said inner and outer compartments, one of said outlet ports in each said compartment being connected by conveyor means with an associated milling unit; feeders in each said outlet port for controllably feeding material for passage into said associated milling unit.

References Cited in the file of this patent

UNITED STATES PATENTS

| | | |
|---|---|---|
| 265,819 | Johnston | Oct. 10, 1882 |
| 569,828 | Herzfeld | Oct. 20, 1896 |
| 760,098 | Bonham | May 17, 1904 |
| 1,717,902 | Wiencke | June 18, 1929 |
| 2,109,534 | Johnson | Mar. 1, 1938 |

FOREIGN PATENTS

| | | |
|---|---|---|
| 9,956 | Great Britain | Apr. 28, 1906 |
| 10,055 | Great Britain | Apr. 30, 1906 |
| 636,397 | France | June 21, 1927 |